(12) United States Patent
Boopalam et al.

(10) Patent No.: US 11,046,325 B2
(45) Date of Patent: Jun. 29, 2021

(54) MONITORING TRANSMISSION SPEED CONTROL REQUEST FOR IMPROVED SHIFT QUALITY

(71) Applicants: Chandrashekar Boopalam, Troy, MI (US); Chandrakant Gavara, Farmington Hills, MI (US)

(72) Inventors: Chandrashekar Boopalam, Troy, MI (US); Chandrakant Gavara, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/817,763

(22) Filed: Mar. 13, 2020

(65) Prior Publication Data

US 2020/0298861 A1 Sep. 24, 2020

Related U.S. Application Data

(60) Provisional application No. 62/822,348, filed on Mar. 22, 2019.

(51) Int. Cl.
| | |
|---|---|
| *B60W 30/19* | (2012.01) |
| *B60W 10/06* | (2006.01) |
| *B60W 10/11* | (2012.01) |
| *F16H 61/472* | (2010.01) |

(52) U.S. Cl.
CPC ............ *B60W 30/19* (2013.01); *B60W 10/06* (2013.01); *B60W 10/11* (2013.01); *B60W 2710/0666* (2013.01); *F16H 61/472* (2013.01)

(58) Field of Classification Search
CPC ...... B60W 10/04; B60W 10/06; B60W 10/08; B60W 10/10; B60W 10/11; B60W 30/188; B60W 30/1882; B60W 30/19; B60W 30/20; B60W 2710/0666; B60W 2710/083
See application file for complete search history.

(56) References Cited

U.S. PATENT DOCUMENTS

| | | | | |
|---|---|---|---|---|
| 6,128,564 | A * | 10/2000 | Graf | B60W 10/11 |
| | | | | 701/51 |
| 6,547,697 | B1 * | 4/2003 | Taffin | B60W 10/06 |
| | | | | 477/109 |
| 7,620,487 | B2 | 11/2009 | Shimada et al. | |
| 7,877,183 | B2 | 1/2011 | Hoff et al. | |
| 8,171,814 | B2 | 5/2012 | Martin et al. | |
| (Continued) | | | | |

*Primary Examiner* — Edwin A Young
(74) *Attorney, Agent, or Firm* — Ralph E. Smith

(57) ABSTRACT

A vehicle control system and method utilize a transmission control module configured to generate a first target speed for a torque generating system for executing a downshift of an automatic transmission and a torque generating system control module configured to determine a second target speed for the torque generating system for executing the downshift of the automatic transmission, determine upper and lower target speed limits for the torque generating system for executing the downshift of the automatic transmission, based on the first and second target speeds and the upper and lower target speed limits, determine a final target speed for the torque generating system for executing the downshift of the automatic transmission, determine a target torque output for the torque generating system based on a current speed of and the final target speed for the torque generating system, and control the torque generating system based on the target torque output.

20 Claims, 3 Drawing Sheets

(56) References Cited

U.S. PATENT DOCUMENTS

| | | |
|---|---|---|
| 9,758,149 B2 | 9/2017 | Doering et al. |
| 10,221,941 B2 | 3/2019 | Kakihara |
| 2017/0361830 A1* | 12/2017 | Cho ................ B60W 30/18063 |
| 2018/0298833 A1* | 10/2018 | Brischetto .............. B60W 10/11 |

* cited by examiner

MONITORING TRANSMISSION SPEED CONTROL REQUEST FOR IMPROVED SHIFT QUALITY

CROSS-REFERENCE TO RELATED APPLICATION(S)

The present application claims the benefit of U.S. Provisional Application No. 62/822,348, filed on Mar. 22, 2019. The disclosure of this application is incorporated herein by reference in its entirety.

FIELD

The present application generally relates to vehicle automatic transmissions and, more particularly, to techniques for improving shift quality by selectively adjusting an engine speed request based on estimated engine torque.

BACKGROUND

An automatic transmission of a vehicle typically comprises a plurality of different gears (first, second, third, etc.). Each gear has a corresponding gear ratio that multiplies drive torque generated at an output shaft of a torque generating system of the vehicle (an engine, an electric motor, or a combination thereof) for transfer to an input shaft of a driveline of the vehicle. A transmission control module typically controls the transmission to select one of these gears based on various operating parameters. A downshift of the transmission refers to shifting from a lower gear ratio (e.g., third gear) to a higher gear ratio (e.g., second gear). Downshifts could be performed, for example, in response to accelerator pedal depression by a driver of the vehicle. Conventional automatic transmission control systems often suffer from slow downshift times and/or noise, vibration, and/or harshness (NVH) caused by clutch engagement during downshifts. Accordingly, while such systems do work for their intended purpose, there remains a need for improvement in the relevant art.

SUMMARY

According to one example aspect of the invention, a control system for a vehicle comprising a torque generating system and an automatic transmission is presented. In one exemplary implementation, the control system comprises: a transmission control module configured to control the automatic transmission and to generate a first target speed for the torque generating system for executing a downshift of the automatic transmission and a torque generating system control module configured to control the torque generating system and to: receive the first target speed for the torque generating system, determine a second target speed for the torque generating system for executing the downshift of the automatic transmission, determine upper and lower target speed limits for the torque generating system for executing the downshift of the automatic transmission, based on the first and second target speeds and the upper and lower target speed limits, determine a final target speed for the torque generating system for executing the downshift of the automatic transmission, determine a target torque output for the torque generating system based on a current speed of and the final target speed for the torque generating system, and control the torque generating system based on the target torque output.

In some implementations, the torque generating system control module is configured to set the first target speed for the torque generating system equal to the second target speed when the first target speed for the torque generating system is greater than the second target speed for the torque generating system. In some implementations, the torque generating system control module is configured to set the first target speed for the torque generating system equal to the lower target speed limit of the torque generating system when the first target speed for the torque generating system is less than the lower target speed limit of the torque generating system. In some implementations, the lower target speed limit for the torque generating system is the current speed of the torque generating system.

In some implementations, the torque generating system control module is configured to set the first target speed for the torque generating system equal to the upper target speed limit of the torque generating system when the first target speed for the torque generating system is greater than the upper target speed limit of the torque generating system. In some implementations, the upper target speed limit for the torque generating system is a maximum or redline speed for the torque generating system. In some implementations, the torque generating system control module is configured to determine the final target speed for the torque generating system as the first target speed for the torque generating system.

In some implementations, the torque generating system control module is configured to determine the target torque output for the torque generating system as a function of (i) a difference between the final target speed for and current speed of the torque generating system and (ii) the final target speed for the torque generating system. In some implementations, the torque generating system control module is further configured to generate a torque multiplier as a function of (i) a current gear of the automatic transmission and (ii) a target gear of the automatic transmission. In some implementations, the torque generating system control module is further configured to multiply the target torque output for the torque generating system by the torque multiplier to obtain and subsequently utilize a modified target torque output for the torque generating system.

According to another example aspect of the invention, a method for controlling a vehicle comprising a torque generating system and an automatic transmission is presented. In one exemplary implementation, the control method comprises: generating, by a transmission control module configured to control the automatic transmission, a first target speed for the torque generating system for executing a downshift of the automatic transmission, receiving, by a torque generating system control module configured to control the torque generating system, the first target speed for the torque generating system from the transmission control module, determining, by the torque generating system control module, a second target speed for the torque generating system for executing the downshift of the automatic transmission, determining, by the torque generating system control module, upper and lower target speed limits for the torque generating system for executing the downshift of the automatic transmission, based on the first and second target speeds and the upper and lower target speed limits, determining, by the torque generating system control module, a final target speed for the torque generating system for executing the downshift of the automatic transmission, determining, by the torque generating system control module, a target torque output for the torque generating system based on a current speed of and the final target speed for the torque generating system, and controlling, by the torque generating system control module, the torque generating system based on the target torque output.

In some implementations, the method further comprises setting, by the torque generating system control module, the first target speed for the torque generating system equal to the second target speed when the first target speed for the torque generating system is greater than the second target speed for the torque generating system. In some implementations, the method further comprises setting, by the torque generating system control module, the first target speed for the torque generating system equal to the lower target speed limit of the torque generating system when the first target speed for the torque generating system is less than the lower target speed limit of the torque generating system. In some implementations, the lower target speed limit for the torque generating system is the current speed of the torque generating system.

In some implementations, the method further comprises setting, by the torque generating system control module, the first target speed for the torque generating system equal to the upper target speed limit of the torque generating system when the first target speed for the torque generating system is greater than the upper target speed limit of the torque generating system. In some implementations, the upper target speed limit for the torque generating system is a maximum or redline speed for the torque generating system. In some implementations, the method further comprises determining, by the torque generating system control module, the final target speed for the torque generating system as the first target speed for the torque generating system.

In some implementations, the method further comprises determining, by the torque generating system control module, the target torque output for the torque generating system as a function of (i) a difference between the final target speed for and current speed of the torque generating system and (ii) the final target speed for the torque generating system. In some implementations, the method further comprises generating, by the torque generating system control module, a torque multiplier as a function of (i) a current gear of the automatic transmission and (ii) a target gear of the automatic transmission. In some implementations, the method further comprises multiplying, by the torque generating system control module, the target torque output for the torque generating system by the torque multiplier to obtain and subsequently utilize a modified target torque output for the torque generating system.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

As discussed above, downshifts of automatic transmissions are often slow and/or suffer from noise, vibration, and/or harshness (NVH) caused by clutch engagement. This can be particularly problematic for transmissions comprising dog clutches that engage during downshifts. This NVH could be due to, for example, speed differences between the output shaft of the torque generating system (an engine, an electric motor, a combination thereof, etc.) and the transmission output shaft or the driveline, which are coupled together. In order to improve the speed and quality of the transmission downshift, the torque generating system output shaft speed could be increased prior to executing the transmission downshift to match or substantially match the transmission output shaft/driveline speed. This is also known as "rev-matching" and is performed in the speed domain. The term "speed domain" as used herein refers to system control based on the torque generating system output shaft speed. Transmission shift control, however, is conventionally performed in the torque domain. The term "torque domain" as used herein refers to system control based on the torque generating system's output torque.

The transmission control module typically provides a speed request to a torque generating system control module (e.g., an engine control module, or ECM), which in turn controls the torque generating system to achieve the speed request. In some cases, however, this speed request could be outside of a desired range or could correspond to a torque value outside of a desired range. This inappropriate speed request could be due to, for example, unintended system malfunctions (processor error, memory corruption, etc.). Performing a downshift of the transmission at operating conditions outside of these ranges could cause substantial NVH (clunk, rattle, etc.), which could potentially be an undesirable operating scenario for the vehicle. Accordingly, the techniques herein operate to clip or limit this speed request when it or a corresponding torque value is outside of their respective desired ranges. In other words, acceptable or appropriate speed requests from the transmission control module are determined and, when appropriate, are then honored by the torque generating system control module in the torque domain. The potential benefits of these techniques include faster and/or smoother downshifts where NVH is mitigated or eliminated.

Figure 1:
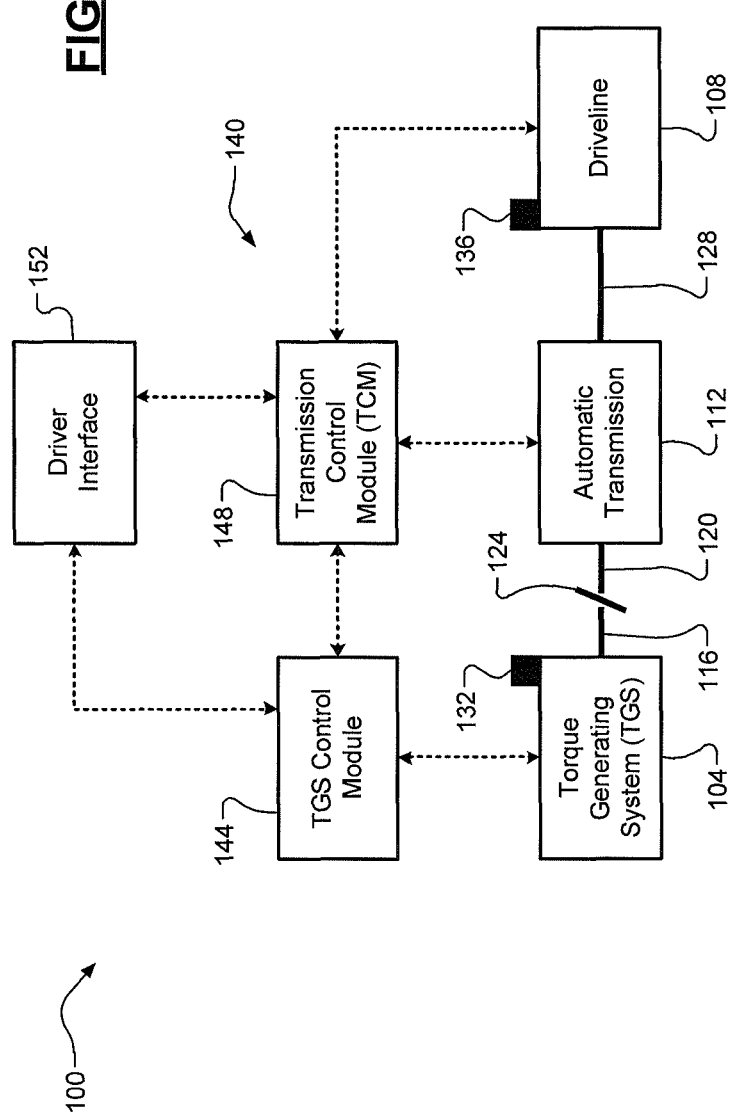
FIG. 1 is a functional block diagram of an example vehicle according to the principles of the present disclosure.

Referring now to FIG. 1, a functional block diagram of an example vehicle 100 according to the principles of the present disclosure is illustrated. The vehicle 100 comprises a torque generating system (TGS) 104 configured to generate drive torque. While the TGS 104 is often an internal combustion engine configured to combust a fuel/air mixture, it will be appreciated that the TGS 104 could be an electric motor or a combination of an engine and one or more electric motors. The drive torque generated by the TGS 104 is transferred to a driveline 108 of the vehicle 100 via an automatic transmission 112 of the vehicle 100. More specifically, an output portion or shaft 116 (e.g., a flywheel coupled to a crankshaft) is selectively coupled to an input portion or shaft 120 of the transmission 112 via a coupling device 124 (e.g., a fluid coupling or a disconnect clutch). The transmission 112 and the driveline 108 are also coupled by an output portion or shaft 128 of the transmission 112.

A TGS speed sensor 132 measures a rotational speed of the output portion or shaft 116 of the TGS 104 and a vehicle speed sensor 136 measures a rotational speed of the output portion or shaft 128 of the transmission 112, which is likely equal to the rotational speed of the driveline 108 (the speed of the vehicle 100) depending on a configuration of the driveline 108 (differentials, transfer case, etc.). A control system 140 of the vehicle 100 controls operation of the vehicle 100 and comprises a TGS controller or control module 144 (e.g., an ECM) and a transmission controller or control module (TCM) 148. The TGS control module 144 primarily controls the TGS 104 and also communicates with a driver interface 152, the TCM 148, and various sensors (sensors 132, 136, etc.). The TCM 148 primarily controls the transmission 112 and also communicates with the driver interface 152, the TGS control module 144, and various sensors (sensors 132, 136, etc.). The driver interface 152 receives driver input (e.g., via an accelerator pedal) indicative of a torque request and can also output information to the driver.

Figure 2:
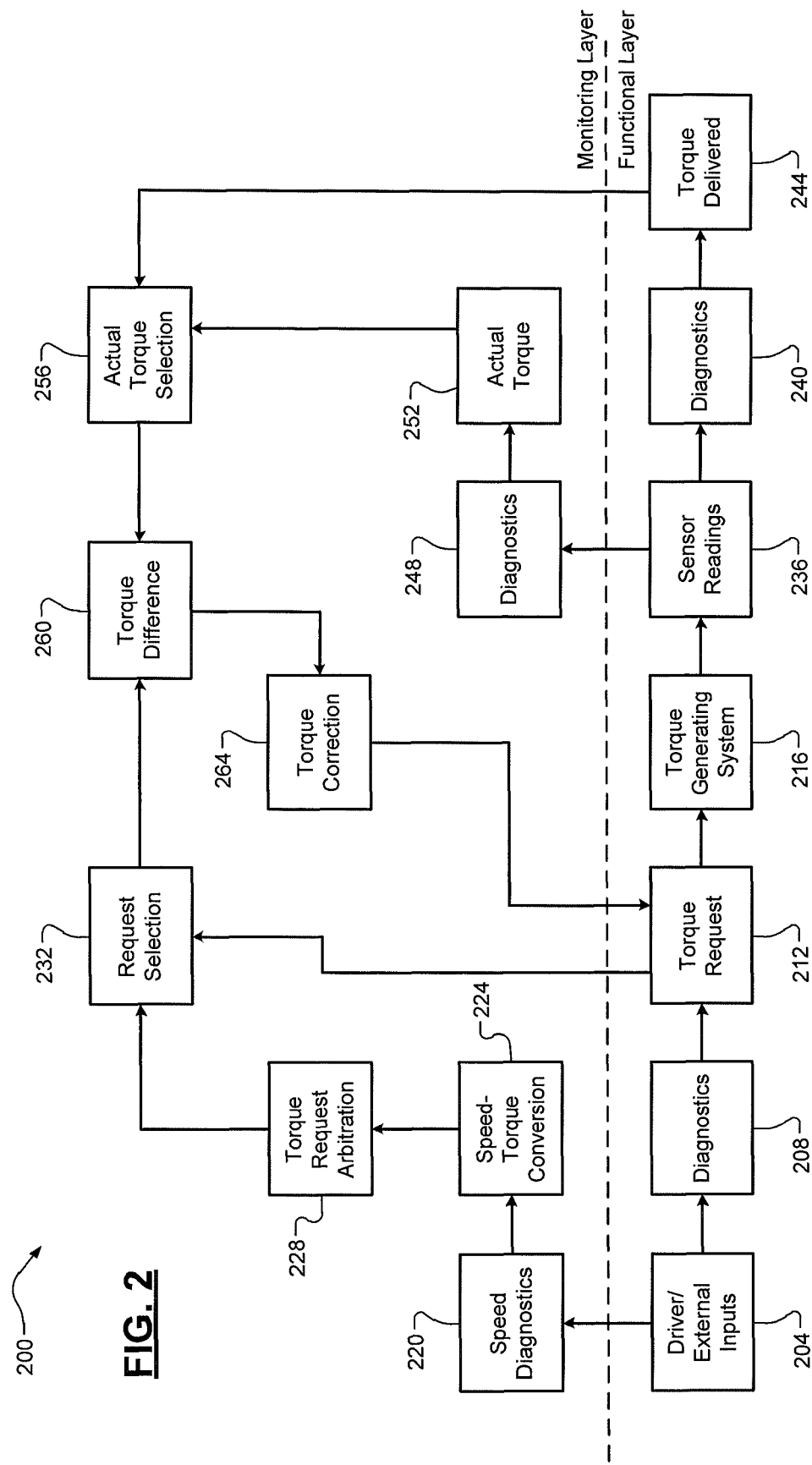
FIG. 2 is a functional block diagram of an example vehicle control architecture according to the principles of the present disclosure.

Referring now to FIG. 2, a functional block diagram of an example control architecture 200 primarily implemented by the TGS 144 according to the principles of the present disclosure is illustrated. In a primary functional layer, a set of driver and/or external inputs are obtained at 204. This could include, for example only, a driver input (e.g., accelerator pedal position), TGS output shaft speed, vehicle speed, current transmission gear (pre-downshift), target transmission gear (post-downshift), and the target TGS speed from the TCM 148. It will be appreciated that other inputs could be obtained and utilized and that other parameters could be known and utilized (e.g., a redline or maximum operable speed of the TGS 104). At 208, diagnostics are performed to validate the various inputs before determining a torque request for the TGS 104 at 212. This torque request is then achieved by the TGS at 216. In a distinct monitoring layer, speed diagnostics are performed on the various inputs at 220. This could include, for example, estimating a target TGS speed as a product of vehicle speed (e.g., transmission output shaft speed) and the target gear (post-downshift) and also determining whether the target TGS speed from the TCM 148 is within acceptable or appropriate limits.

A lower limit could be determined by the current speed of the TGS 104 (e.g., as measured by sensor 132) and an upper limit could be determined as a minimum of the estimated target TGS speed and the redline speed of the TGS 104. When the target TGS speed provided by the TCM 148 is outside of these limits, the nearby limit value (i.e., the lower or upper limit value) is set as the target TGS speed. At 224, a conversion from the speed domain to the torque domain is performed. More specifically, the target TGS speed after 220 is utilized to estimate a feedforward torque at the TGS output shaft 116 (e.g., engine flywheel torque). At 228 and 232, torque request arbitration and selection are performed. This could include, for example, selecting the minimum of the torque request from 212 and the estimated feedforward torque from 224. The selected torque request is then provided to 260, which is part of a feedback correction loop (e.g., a proportional-integral, or PI feedback loop) of the monitoring layer.

In the primary functional layer, sensor readings regarding operation of the TGS 104 are obtained at 236. Diagnostics are performed on these sensor readings at 240 to validate the readings and the actual torque delivered or generated by the TGS 104 is determined at 244. The same or similar diagnostics as 240 are also performed at 248 in the monitoring layer and the same or similar actual torque value as 244 is determined in 252 in the monitoring layer. The actual torque values from 244 and 252 are both fed to 256 where one of these values is selected. For example, a maximum of these two actual torque values could be selected. The selected actual torque value is then fed to 260. A difference or error between the selected torque request from 232 and the selected actual torque value from 256 is then calculated at 260. This error is then fed to 264 where torque correction is performed. This could include, for example only, calculating a torque multiplier value that could then be utilized to modify the torque request at 212. The torque multiplier could be calculated, for example only, as a function of the error, the current gear, and the target gear. This multiplier represents a fine-tuning of the torque request at 212.

Figure 3:
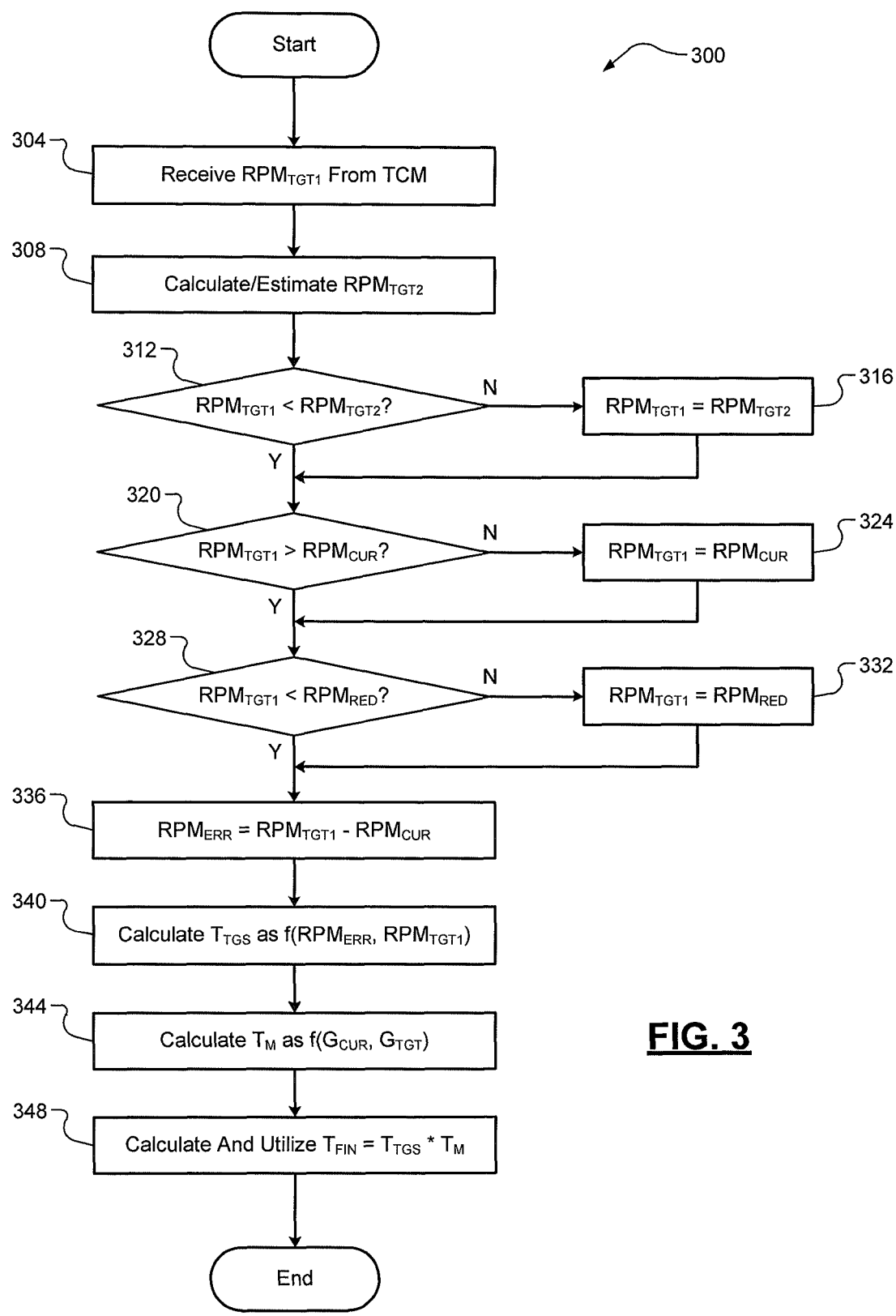
FIG. 3 is a flow diagram of an example method of monitoring a transmission speed control request for improved shift quality according to the principles of the present disclosure.

Referring now to FIG. 3, a flow diagram of an example method 300 of monitoring a transmission speed control request for improved shift quality according to the principles of the present disclosure is illustrated. At 304, the TGS control module 144 receives a target speed ($RPM_{TGT1}$) for the TGS 104 from the TCM 148. This target speed $RPM_{TGT1}$, for example, could be for rev-matching. At 308, the TGS control module 144 calculates or otherwise estimates a target speed $RPM_{TGT2}$ for the TGS 104. In some implementations, this calculation/estimation could be similar to the calculation/estimation performed by the TCM 148 to obtain its target speed $RPM_{TGT1}$, but it will be appreciated that the TGS control module 144 could take a different approach in calculating/estimating target sped $RPM_{TGT2}$. At 312, the TGS control module 144 determines whether target speed $RPM_{TGT1}$ is less than target speed $RPM_{TGT2}$. When false, the method 300 proceeds to 316 where target speed $RPM_{TGT1}$ is set equal to target speed $RPM_{TGT2}$ and the method 300 proceeds to 320. Otherwise, the method 300 proceeds directly to 320.

At 320, the TGS control module 144 determines whether target speed $RPM_{TGT1}$ is greater than a current speed ($RPM_{CUR}$) of the TGS 104 (e.g., measured by sensor 132). When false, the method 300 proceeds to 324 where target speed $RPM_{TGT1}$ is set equal to current speed $RPM_{CUR}$ and the method 300 proceeds to 328. Otherwise, the method 300 proceeds directly to 328. At 328, the TGS control module 144 determines whether target speed $RPM_{TGT1}$ is less than a redline or maximum allowable speed ($RPM_{RED}$) for the TGS 104. When false, the method 300 proceeds to 332 where target speed $RPM_{TGT1}$ is set equal to redline speed $RPM_{RED}$ and the method 300 proceeds to 336. Otherwise, the method 300 proceeds directly to 336. At 336, the TGS control module 144 calculates a speed difference or error ($RPM_{ERR}$) as a difference between target speed $RPM_{TGT1}$ and current speed $RPM_{CUR}$.

At 340, the TGS control module 144 calculates a target torque ($T_{TGS}$) for the TGS 104 as a function of speed error $RPM_{ERR}$ and target speed RPM $T_{GT1}$. This could include, for example, using a proportional-integral (PI) control scheme, but it will be appreciated that any suitable control scheme could be utilized. At 344, the TGS control module 144 calculates a torque multiplier ($T_M$) as a function of a current gear ($G_{CUR}$) before the downshift and a target gear ($G_{TGT}$) after the downshift. This torque multiplier $T_M$ could be, for example, based on a ratio of the gear ratios of the current and target gears $G_{CUR}$, $G_{TGT}$. At 348, the TGS control module 144 calculates and then utilizes a final torque ($T_{FIN}$) as a product of target torque $T_{TGS}$ and the torque multiplier $T_M$. The utilization of this target torque $T_{TGS}$ could include, for example, adjusting air/fuel/spark of an engine and/or voltage/current provided to electric motor(s) in order for the TGS 104 to achieve the target torque $T_{TGS}$. The method 300 then ends or returns to 304 for one or more additional cycles.

It will be appreciated that the terms "controller" and "module" as used herein refer to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle comprising a torque generating system and an automatic transmission, the control system comprising:
    a transmission control module configured to control the automatic transmission and to generate a first target speed for the torque generating system for executing a downshift of the automatic transmission; and
    a torque generating system control module configured to control the torque generating system and to:
        receive the first target speed for the torque generating system;
        determine a second target speed for the torque generating system for executing the downshift of the automatic transmission;
        determine upper and lower target speed limits for the torque generating system for executing the downshift of the automatic transmission;
        based on the first and second target speeds and the upper and lower target speed limits, determine a final target speed for the torque generating system for executing the downshift of the automatic transmission;
        determine a target torque output for the torque generating system based on a current speed of and the final target speed for the torque generating system; and
        control the torque generating system based on the target torque output.

2. The control system of claim 1, wherein the torque generating system control module is configured to set the first target speed for the torque generating system equal to the second target speed when the first target speed for the torque generating system is greater than the second target speed for the torque generating system.

3. The control system of claim 2, wherein the torque generating system control module is configured to set the first target speed for the torque generating system equal to the lower target speed limit of the torque generating system when the first target speed for the torque generating system is less than the lower target speed limit of the torque generating system.

4. The control system of claim 3, wherein the lower target speed limit for the torque generating system is the current speed of the torque generating system.

5. The control system of claim 3, wherein the torque generating system control module is configured to set the first target speed for the torque generating system equal to the upper target speed limit of the torque generating system when the first target speed for the torque generating system is greater than the upper target speed limit of the torque generating system.

6. The control system of claim 5, wherein the upper target speed limit for the torque generating system is a maximum or redline speed for the torque generating system.

7. The control system of claim 5, wherein the torque generating system control module is configured to determine the final target speed for the torque generating system as the first target speed for the torque generating system.

8. The control system of claim 7, wherein the torque generating system control module is configured to determine the target torque output for the torque generating system as a function of (i) a difference between the final target speed for and current speed of the torque generating system and (ii) the final target speed for the torque generating system.

9. The control system of claim 8, wherein the torque generating system control module is further configured to generate a torque multiplier as a function of (i) a current gear of the automatic transmission and (ii) a target gear of the automatic transmission.

10. The control system of claim 9, wherein the torque generating system control module is further configured to multiply the target torque output for the torque generating system by the torque multiplier to obtain and subsequently utilize a modified target torque output for the torque generating system.

11. A method for controlling a vehicle comprising a torque generating system and an automatic transmission, the method comprising:
    generating, by a transmission control module configured to control the automatic transmission, a first target speed for the torque generating system for executing a downshift of the automatic transmission;
    receiving, by a torque generating system control module configured to control the torque generating system, the first target speed for the torque generating system from the transmission control module;
    determining, by the torque generating system control module, a second target speed for the torque generating system for executing the downshift of the automatic transmission;
    determining, by the torque generating system control module, upper and lower target speed limits for the torque generating system for executing the downshift of the automatic transmission;
    based on the first and second target speeds and the upper and lower target speed limits, determining, by the torque generating system control module, a final target speed for the torque generating system for executing the downshift of the automatic transmission;
    determining, by the torque generating system control module, a target torque output for the torque generating system based on a current speed of and the final target speed for the torque generating system; and
    controlling, by the torque generating system control module, the torque generating system based on the target torque output.

12. The method of claim 11, further comprising setting, by the torque generating system control module, the first target speed for the torque generating system equal to the second target speed when the first target speed for the torque generating system is greater than the second target speed for the torque generating system.

13. The method of claim 12, further comprising setting, by the torque generating system control module, the first target speed for the torque generating system equal to the lower target speed limit of the torque generating system when the first target speed for the torque generating system is less than the lower target speed limit of the torque generating system.

14. The method of claim 13, wherein the lower target speed limit for the torque generating system is the current speed of the torque generating system.

15. The method of claim 13, further comprising setting, by the torque generating system control module, the first target speed for the torque generating system equal to the upper target speed limit of the torque generating system when the first target speed for the torque generating system is greater than the upper target speed limit of the torque generating system.

16. The method of claim 15, wherein the upper target speed limit for the torque generating system is a maximum or redline speed for the torque generating system.

17. The method of claim 15, further comprising determining, by the torque generating system control module, the final target speed for the torque generating system as the first target speed for the torque generating system.

18. The method of claim 17, further comprising determining, by the torque generating system control module, the target torque output for the torque generating system as a function of (i) a difference between the final target speed for and current speed of the torque generating system and (ii) the final target speed for the torque generating system.

19. The method of claim 18, further comprising generating, by the torque generating system control module, a torque multiplier as a function of (i) a current gear of the automatic transmission and (ii) a target gear of the automatic transmission.

20. The method of claim 19, further comprising multiplying, by the torque generating system control module, the target torque output for the torque generating system by the torque multiplier to obtain and subsequently utilize a modified target torque output for the torque generating system.

* * * * *